(12) United States Patent
Kawase et al.

(10) Patent No.: US 8,156,562 B2
(45) Date of Patent: Apr. 10, 2012

(54) INFORMATION PROCESSING APPARATUS, IMAGE FORMING APPARATUS, IMAGE FORMING SYSTEM, INFORMATION PROCESSING METHOD, AND IMAGE FORMING METHOD

(75) Inventors: Michio Kawase, Abiko (JP); Shunichi Komatsu, Abiko (JP); Michiharu Masuda, Abiko (JP); Yoshihito Osari, Tokyo (JP); Tsunao Hombo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 11/278,719

(22) Filed: Apr. 5, 2006

(65) Prior Publication Data

US 2006/0222352 A1 Oct. 5, 2006

(30) Foreign Application Priority Data

Apr. 5, 2005 (JP) ................................. 2005-109222

(51) Int. Cl.
G06F 21/00 (2006.01)
(52) U.S. Cl. .............. 726/26; 726/2; 713/176; 713/186; 359/2
(58) Field of Classification Search ................ 726/2, 26; 713/176, 186; 359/2
See application file for complete search history.

(56) References Cited

U.S. PATENT DOCUMENTS

| | | | | |
|---|---|---|---|---|
| 5,633,932 A * | 5/1997 | Davis et al. | ................ | 713/176 |
| 5,815,252 A * | 9/1998 | Price-Francis | ................ | 356/71 |
| 6,310,475 B1 | 10/2001 | Kawase et al. | | |
| 6,993,659 B2 * | 1/2006 | Milgramm et al. | ............. | 713/186 |
| 7,353,260 B1 * | 4/2008 | Senum | .................... | 709/217 |
| 7,929,167 B2 * | 4/2011 | Kato | ............................ | 358/1.15 |
| 2001/0016912 A1 * | 8/2001 | Takahashi | ...................... | 713/200 |
| 2002/0083114 A1 * | 6/2002 | Mazzagatte et al. | ......... | 709/100 |
| 2003/0202199 A1 * | 10/2003 | Carter et al. | ................ | 358/1.13 |
| 2004/0088562 A1 * | 5/2004 | Vassilev et al. | ............... | 713/200 |
| 2004/0125398 A1 * | 7/2004 | Aiyama | ....................... | 358/1.14 |
| 2004/0128532 A1 * | 7/2004 | Ohishi et al. | .................. | 713/200 |
| 2005/0129423 A1 * | 6/2005 | Lester et al. | .................. | 399/79 |
| 2005/0162684 A1 * | 7/2005 | Brown et al. | ................. | 358/1.15 |
| 2005/0231759 A1 * | 10/2005 | Kamijima | .................... | 358/1.15 |
| 2005/0273865 A1 * | 12/2005 | Slijp et al. | ....................... | 726/28 |
| 2006/0107039 A1 * | 5/2006 | Sugiura et al. | .................. | 713/156 |
| 2006/0168005 A1 * | 7/2006 | Kanbara et al. | ............... | 709/206 |
| 2006/0187486 A1 * | 8/2006 | Tsuchitoi | ...................... | 358/1.15 |
| 2009/0038002 A1 * | 2/2009 | Minegishi | ........................ | 726/16 |
| 2010/0030707 A1 * | 2/2010 | Jingu | ................................ | 705/400 |
| 2010/0142989 A1 * | 6/2010 | Oak | .................................. | 399/80 |
| 2010/0235888 A1 * | 9/2010 | Miyamoto | ......................... | 726/4 |
| 2010/0302573 A1 * | 12/2010 | Hakozaki | ...................... | 358/1.14 |
| 2011/0067090 A1 * | 3/2011 | Osaki | ................................ | 726/4 |
| 2011/0113469 A1 * | 5/2011 | Takahashi | ........................ | 726/1 |
| 2011/0302637 A1 * | 12/2011 | Hamada | ............................ | 726/5 |

FOREIGN PATENT DOCUMENTS

| | | |
|---|---|---|
| JP | 8-16520 | 1/1996 |
| JP | 10-83263 | 3/1998 |
| JP | 2003-94777 | 4/2003 |

* cited by examiner

*Primary Examiner* — Nathan Flynn
*Assistant Examiner* — Sarah Su
(74) *Attorney, Agent, or Firm* — Fitzpatrick, Cella, Harper & Scinto

(57) ABSTRACT

An information processing apparatus determines whether an authentication portion on an image forming apparatus side can authenticate user authentication information input on the information processing apparatus side. If it is determined that the authentication portion on the image forming apparatus side can authenticate the user authentication information input on the information processing apparatus side, transmission of image data from the information processing apparatus to the image forming apparatus is controlled.

19 Claims, 12 Drawing Sheets

INFORMATION PROCESSING APPARATUS, IMAGE FORMING APPARATUS, IMAGE FORMING SYSTEM, INFORMATION PROCESSING METHOD, AND IMAGE FORMING METHOD

FIELD OF THE INVENTION

The present invention relates to an image forming technique and, more particularly, to an image forming technique of forming an image upon authenticating a user's personal information at the time of image formation.

BACKGROUND OF THE INVENTION

It is recently possible to connect a WWW (World Wide Web) server that stores various kinds of information and a computer with dedicated software (to be referred to as a "browser" hereinafter) to access the server by HTTP (Hyper Text Transfer Protocol) through a network and allow the computer to refer to the information on the WWW server. The browser can receive the information on the WWW server and store it in the computer. When a user wants to print the data, the data temporarily stored in the computer can be output to a printer with a print function and printed. Various kinds of data on the WWW server can be printed in this way.

However, in printing data acquired from the WWW server, the conventional printer always executes predetermined image processing independently of the presence/absence of image management. Hence, a printer which prints important data in cooperation with an authentication function of checking whether the user is authentic becomes more important.

There is provided, e.g., a printer system capable of managing disclosure of documents stored in a document server for each document component for users with different access rights from the viewpoint of security in information management. For example, a BOX function is used to ensure the security of print jobs. This function makes sent image data open to only a specific user by using ID authentication based on, e.g. a password in an image output device. Information output as an image can be prevented from leaking to unspecified users.

Examples of the above-described prior art are disclosed in, e.g., Japanese Patent Laid-Open Nos. 10-83263 and 2003-94777.

However, a password generally used in information management is defined by a predetermined combination of complex key operations or ID input. Alternatively, a user is authenticated by using a specific authentication card. Hence, the key operation method may leak, or the authentication card or ID may be stolen. Anyone who has acquired password information can access information even when the box function is used.

In the BOX function of a conventional network printer, the image output destination can freely be selected in issuing a job independently of the security level. Even when a wrong output destination is selected, data is sent to the image forming apparatus. For this reason, if password information leaks, the security of the job is not ensured. In addition, a function of reading encrypted image data and decoding and printing it in accordance with a result of personal authentication or system authentication determination is not available. For this reason, if security settings incompatible with the security management function are incorporated in image data, illegal copying cannot be prevented.

On the other hand, Japanese Patent Laid-Open No. 8-16520 discloses the following contents. An information processing apparatus inquires of an output device about the presence/absence of an authentication function. The output device notifies the information processing apparatus side of the presence/absence of the authentication function. In accordance with the result, the user on the information processing apparatus side can select use of the authentication function. To use the authentication function on the output device side, the information processing apparatus side transmits a password and image data to the output device, and the output device stores them. The user of the information processing apparatus inputs a password to the output device. If the password matches that stored in the output device, the image data is output.

As described above, in Japanese Patent Laid-Open No. 8-16520, the information processing apparatus only inquires of the output device about the presence/absence of the authentication function and uses the function if it is present. If the authentication scheme of the information processing apparatus is different from that of the output device, personal authentication is impossible on the output device side. Hence, even when the image data is transmitted, it is not output, resulting in poor usability and failures in ensuring job security. That is, the technique of Japanese Patent Laid-Open No. 8-16520 does not execute information management of the security level of the authentication scheme input on the information processing apparatus side and the authentication scheme input on the output device side.

SUMMARY OF THE INVENTION

The present invention has been proposed to solve the conventional problems, and has as its object to cause an information processing apparatus to execute information management of the security level of the authentication scheme input on the information processing apparatus side and the authentication scheme input on an output device side and transmit image data while improving usability and ensuring job security by determining whether the personal authentication input on the information processing apparatus side can be authenticated by the authentication scheme on the output device side (whether the authentication schemes equal).

It is another object of the present invention to provide an image forming technique which allows image formation corresponding to the security environment of an output destination on the basis of ID information for personal authentication of a user and output restriction information to control output of image data.

In order to achieve the above object, an information processing apparatus and image forming apparatus according to the present invention are characterized by comprising the following arrangements.

According to the present invention, the foregoing object is attained by providing an information processing apparatus which transmits image data to output from an image forming apparatus through a network, comprising:

an authentication information input portion which inputs authentication information of a user;

a first determination portion which determines whether an authentication portion of the image forming apparatus is adapted to authenticate the authentication information; and a transmission controller which controls in accordance with a determination of the first determination portion whether to transmit the image data to the image forming apparatus.

According to another aspect of the present invention, the foregoing object is attained by providing an information processing apparatus which receives image data and authentication information of a user to output from an image forming apparatus through a network, comprising:

a first determination portion which determines whether an authentication portion of the image forming apparatus is adapted to authenticate the authentication information; and a transmission controller which controls in accordance with a determination of the first determination portion whether to transmit the image data to the image forming apparatus.

According to another aspect of the present invention, the foregoing object is attained by providing an image forming system comprising an image forming apparatus which outputs image data transmitted from an information processing apparatus through a network, the information processing apparatus comprising:

an authentication information input portion which inputs authentication information of a user;

a first determination portion which determines whether an authentication portion of the image forming apparatus is adapted to authenticate the authentication information; and a transmission controller which transmits the authentication information and the image data to the image forming apparatus when the first determination portion determines that the authentication portion of the image forming apparatus is adapted to authenticate the authentication information, and the image forming apparatus comprising:

an authentication portion;

a second determination portion which determines whether authentication information inputted in the authentication portion matches the transmitted authentication information; and an image formation controller which outputs the image data when the second determination portion determines that each of the authentication information match each other.

According to another aspect of the present invention, the foregoing object is attained by providing an image forming system comprising:

a second information processing apparatus which receives image data from a first information processing apparatus through a network; and an image forming apparatus which outputs the image data from the second information processing apparatus through the network, the first information processing apparatus comprising:

an authentication information input portion which inputs authentication information of a user; and a first transmission controller which transmits designation information of the designated image forming apparatus, the image data, and the authentication information to the second information processing apparatus, the second information processing apparatus comprising:

a first determination portion which determines whether an authentication portion of the designated image forming apparatus is adapted to authenticate the authentication information; and a second transmission controller which transmits the authentication information and the image data to the designated image forming apparatus when the first determination portion determines that the authentication portion of the image forming apparatus is adapted to authenticate the authentication information, and the image forming apparatus comprising:

the authentication portion;

a second determination portion which determines whether authentication information inputted in the authentication portion matches the transmitted authentication information; and an image formation controller which outputs the image data when the second determination portion determines that each of the authentication information match each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
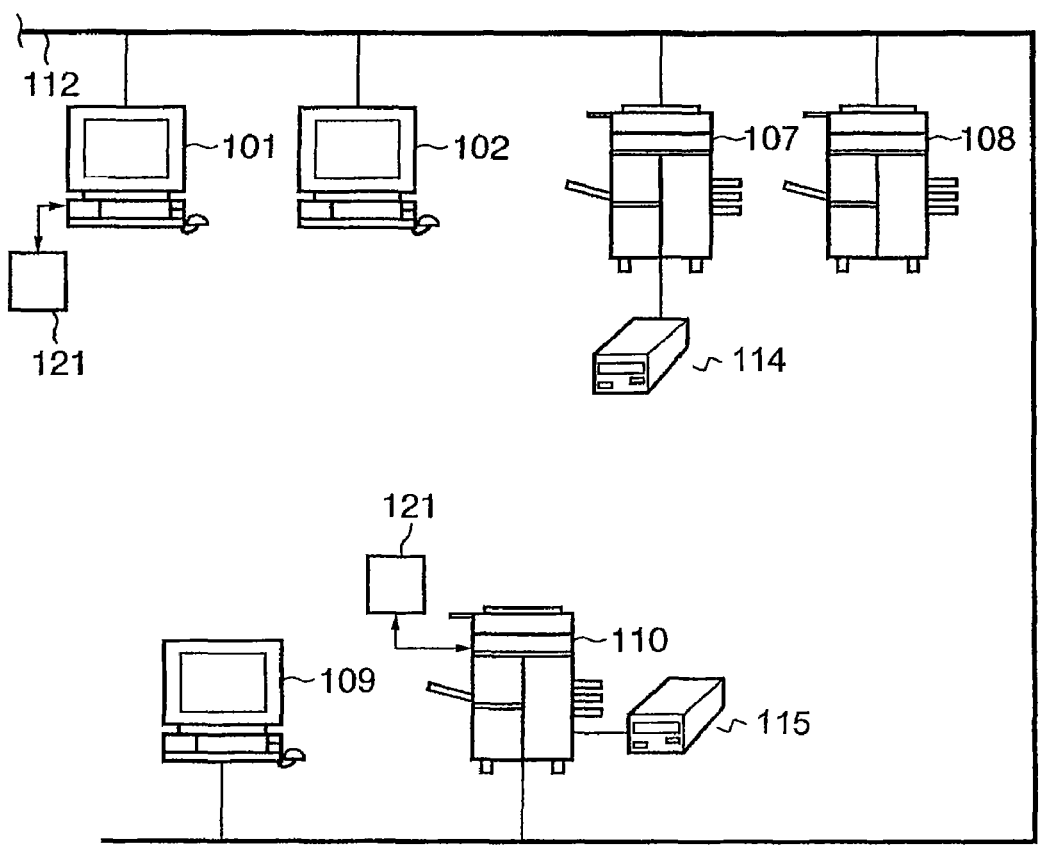
FIG. 1 is a view showing the configuration of an image forming system according to the first embodiment of the present invention.

FIG. 1 is a view showing the configuration of an image forming system according to the first embodiment of the present invention. Information processing apparatuses 101 and 109 (to be referred to as "personal computers" hereinafter) are normally used by users. The personal computers 101 and 109 can create image data (document data) and transmit/receive e-mail to/from another computer on the network. The personal computers 101 and 109 have an ID registration unit by key input through a keyboard. The authentication scheme information is sent to a print server 102. The personal computer 101 and the like also comprise an ID information input device 121 to input authentication information of a user. The authentication scheme information is sent to the print server 102. The print server 102 manages print queues, user accounts, and the authentication schemes of the apparatuses.

The print server 102 is connected to a network 112 (including the Internet and a LAN) and holds various kinds of image data and document data.

The print server 102 has a function (to be described later) of determining ID information added to image data. The print server 102 can also determine the security level of the determined ID information.

Image forming apparatuses 107, 108, and 110 have a large liquid crystal touch panel and include both a scanner function and a printer function. More specifically, each image forming apparatus as a stand-alone apparatus has a copy function. When a magnetooptical disk unit 114 or 115 is connected, the image forming apparatus also functions as an electronic filing apparatus. The image forming apparatuses 107, 108, and 110 also function as printers for the computers 101 and 109. Each image forming apparatus receives, e.g., image formation command data for a document created by the computer 101 or 109 through the network 112, rasterizes the data into bitmap image data, and prints it.

The image forming apparatus 110 comprises the ID information input device 121. With the ID information input device 121, the image forming apparatus 110 can input ID information to authenticate user's personal information. The image forming apparatus 110 also comprises an input unit which receives, by key input from an operation unit 172 (FIG. 9), information about a password or encrypted personal code as personal information. These units can selectively be used in accordance with the quantity of ID information added to image data to be processed or a required security authentication level.

The image forming apparatus 108 includes neither ID authentication units and therefore has the lowest security level.

The image forming apparatus 107 comprises an input unit which receives, by key input from the operation unit 172 (FIG. 9), information about a password or encrypted personal code as personal information but no ID information input device 121.

In the above-described image forming system, the image forming apparatuses 107, 108, and 110 notify the server 102 of the authentication schemes (security levels) of their personal authentication units. The print server 102 grasps the authentication scheme (security level) of the personal authentication unit of each image forming apparatus.

The ID information input device 121 can be included in an image forming system as, e.g., a fingerprint reader or fingerprint information sensor. In this embodiment, an example will be described in which a fingerprint reader to execute authentication on the basis of fingerprint information is used as the ID information input device 121 (to be referred to as a "fingerprint reader" hereinafter) to provide an image forming system of higher security. In this embodiment, a fingerprint is detected as data to be used to collate authentication information. However, the present invention is not limited to this. A personal authentication method using any other personal biological information such as a human retina pattern or human voice may also be employed. The present invention can also be practiced by using ID information such as a known public key number based on a combination of normal number and character information.

(Fingerprint Reader)

Figure 2:
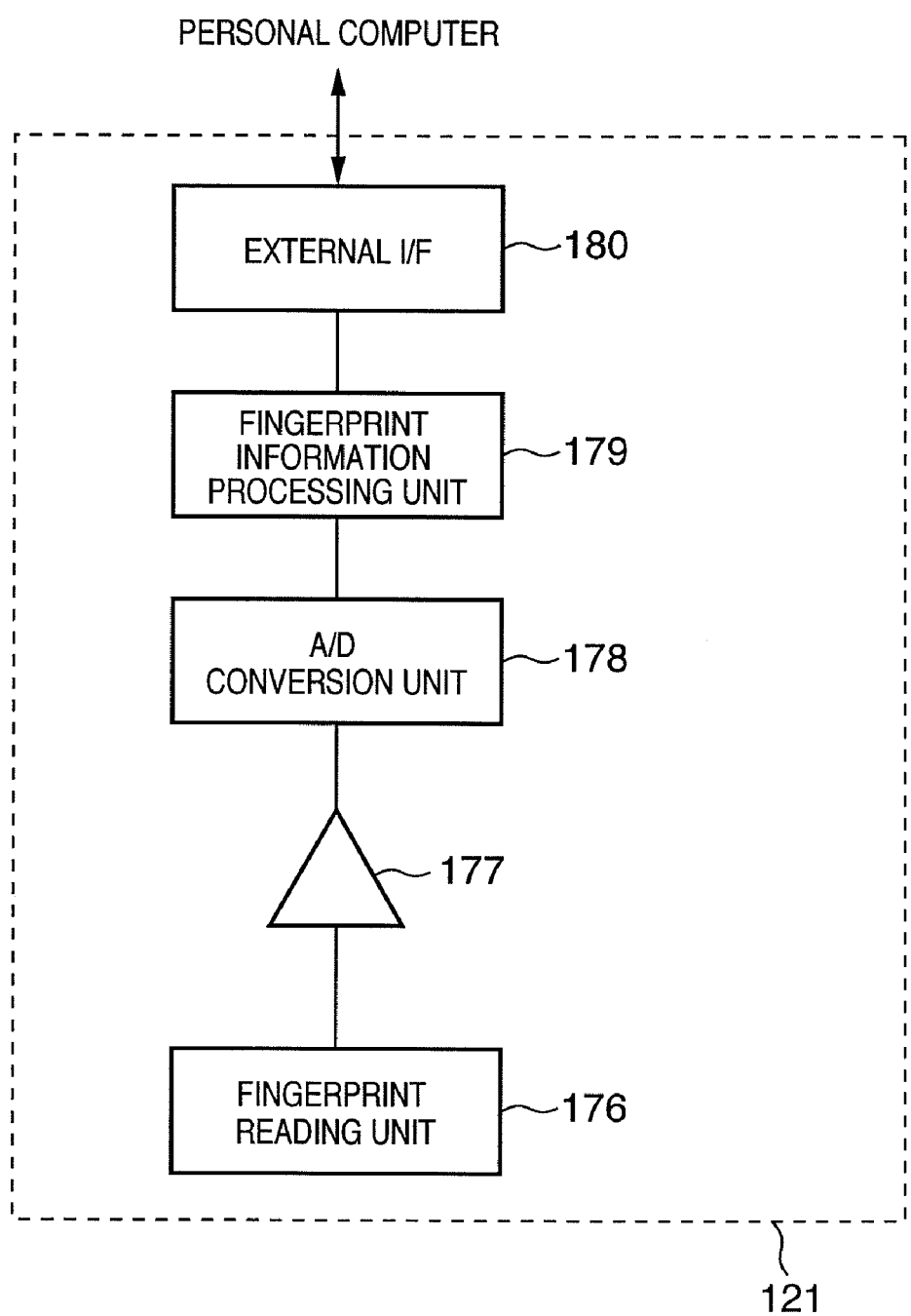
FIG. 2 is a block diagram for explaining the arrangement of a fingerprint reader 121.

The arrangement of the fingerprint reader 121 will be described here with reference to FIG. 2. A fingerprint reading unit 176 senses a user's fingerprint. An amplifier 177 amplifies an analog image signal corresponding to the user's fingerprint. An A/D conversion unit 178 converts the analog fingerprint data amplified by the amplifier 177 into digital data. A fingerprint information processing unit 179 extracts feature amount data from the fingerprint information converted into digital data. The extracted fingerprint feature amount data is output to a personal computer through an external I/F 180. In personal authentication, personal information recorded in the personal computer 101 may be read out at a predetermined timing and compared with feature amount data corresponding to a user's fingerprint input through the A/D conversion unit 178 and fingerprint information processing unit 179, thereby determining whether the user is identical to a user who is registered in advance.

Figure 3:
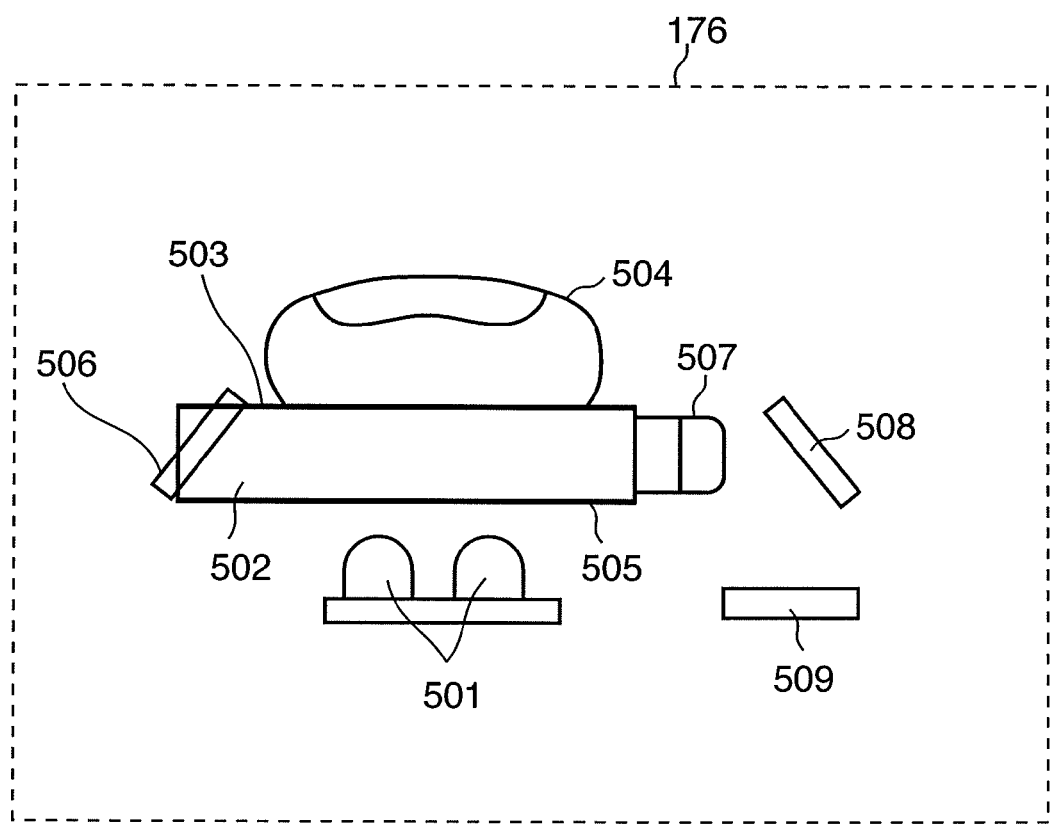
FIG. 3 is a view for explaining details of a fingerprint reading unit 176.

FIG. 3 is a view for explaining details of the fingerprint reading unit 176. LEDs 501 irradiate a reading surface 503, i.e., the upper surface of a flat glass plate 502 with light having a predetermined intensity. A user's finger 504 is placed on the reading surface 503. Of reflected light reflected by the reading surface 503, light components from fingerprint ridges are totally reflected by a reflecting surface 505 of the flat glass plate 502. Light components from fingerprint valleys pass through the flat glass plate 502. The reflected light from the fingerprint ridges, which is totally reflected by the reflecting surface 505, is deflected by a deflection mirror 506 and focused by a lens 507. The reflected light focused by the lens 507 is deflected by a deflection mirror 508 again and strikes a reading sensor 509. The reading sensor 509 converts an optical (image) signal into an electrical signal by using a semiconductor element (photodiode) whose electrostatic capacitance changes depending on input of light.

(Printing of Document Data)

Procedures of causing the image forming apparatus to print document data (image data) received from the personal computer 101 or 109 connected to the network 112 will be described next.

Document data created by the personal computer 101 or 109 is transmitted from the personal computer 101 or 109 to the print server 102 in accordance with a print start instruction from the user. An image formation command to cause the image forming apparatus to process the image data as the print target output from the personal computer 101 or 109 in accordance with the print start instruction contains domain addresses representing the address of the personal computer 101 or 109 serving as a transmission source and the address of a transmission destination, i.e., the image forming apparatus 107, 108, or 110 on the network to execute print processing.

The image formation command may contain ID information (to be described later). Upon receiving the image data, the print server 102 can determine by checking the contents of the image formation command whether ID information for personal authentication of the user is added.

In outputting the image data on the image forming apparatus side, the personal computer 101 or the like serving as the image data generation source can generate, in accordance with user setting, output restriction information to control output (e.g., inhibit output of image data or permit only partial print output) on the basis of the ID information authentication result and transmit the image formation command containing the output restriction information to the print server 102.

If the personal computer 101 or 109 has set no ID information in generating document data, the document data can be printed by any one of the image forming apparatuses 107, 108, and 110.

Information transmission/reception on the network 112 using the HTTP protocol as an example of a communication protocol will be described. The present invention is not limited to this, and any other communication protocol can also be applied. A command may be transmitted to a server that holds desired image data designated by the user through the operation unit. Image formation may be done by acquiring the image data held by the server in accordance with reply from the server. At this time, the operation unit is used to designate a printer as a desired print output destination and designate a location (e.g., a server) where image data to be printed by using the designated printer is held.

The HTTP protocol will be described next.

The HTTP protocol is a service on a TCP/IP protocol, which is used to transfer image data or data described in HTML (HyperText Markup Language). The HTTP protocol is normally used in a system in which a client computer to issue a data transfer request and a server to hold data are connected through a network.

An HTTP client is caused to run on the client computer. In the HTTP client, the user inputs the location of data on the server by using a designation format called a URL to designate the location where the data is held. The HTTP client issues an information transfer request to the server in accordance with the input of the URL.

The HTTP protocol includes a GET command to request data and a HEAD command to request associated information of the data. Generally, the type of data to be acquired is determined in advance by the HEAD command, and then, the data is acquired by the GET command and processed.

Associated information that can be acquired by the HEAD command includes not only information of the data size and update date/time but also data format information. The data format information is called "content-type". For example, data described in HTML has an extension "text/html", GIF image data has an extension "image/gif", and JPEG image data has an extension "image/jpeg". The type of data can be determined on the basis of the extension. Similarly, to designate a PDL file, an extension "image/pdl" is added. The format of each attribute can be designated in accordance with the extension.

For example, assume that the host name of the print server 102 is "host.co.jp", and the location of data as an acquisition target on the server is "/pub/image.GIF". In this case, the HTTP client issues a HEAD command corresponding to "/pub/image.GIF" to the server "host.co.jp" by inputting a URL "http://host.co.jp/pub/image.GIF".

Upon receiving the HEAD command, the server 102 transmits, as a reply to the HEAD command, the format information of the data of "/pub/image.GIF" to the HTTP client that has issued the HEAD command.

Upon receiving the reply to the HEAD command, the HTTP client issues a GET command corresponding to "/pub/image.GIF" to the server "host.co.jp".

Upon receiving the GET command, the server 102 transmits, as a reply to the GET command, the data of "/pub/image.GIF" to the HTTP client that has issued the GET command.

Upon receiving the reply to the GET command, the HTTP client can receive the data of format information "/pub/image.GIF" received as the reply to the HEAD command and process the received data.

In this way, the HTTP client can acquire designated data which is stored in the designated server 102 together with the associated information of the data on the basis of the URL input from the operation unit 172.

Figure 9:
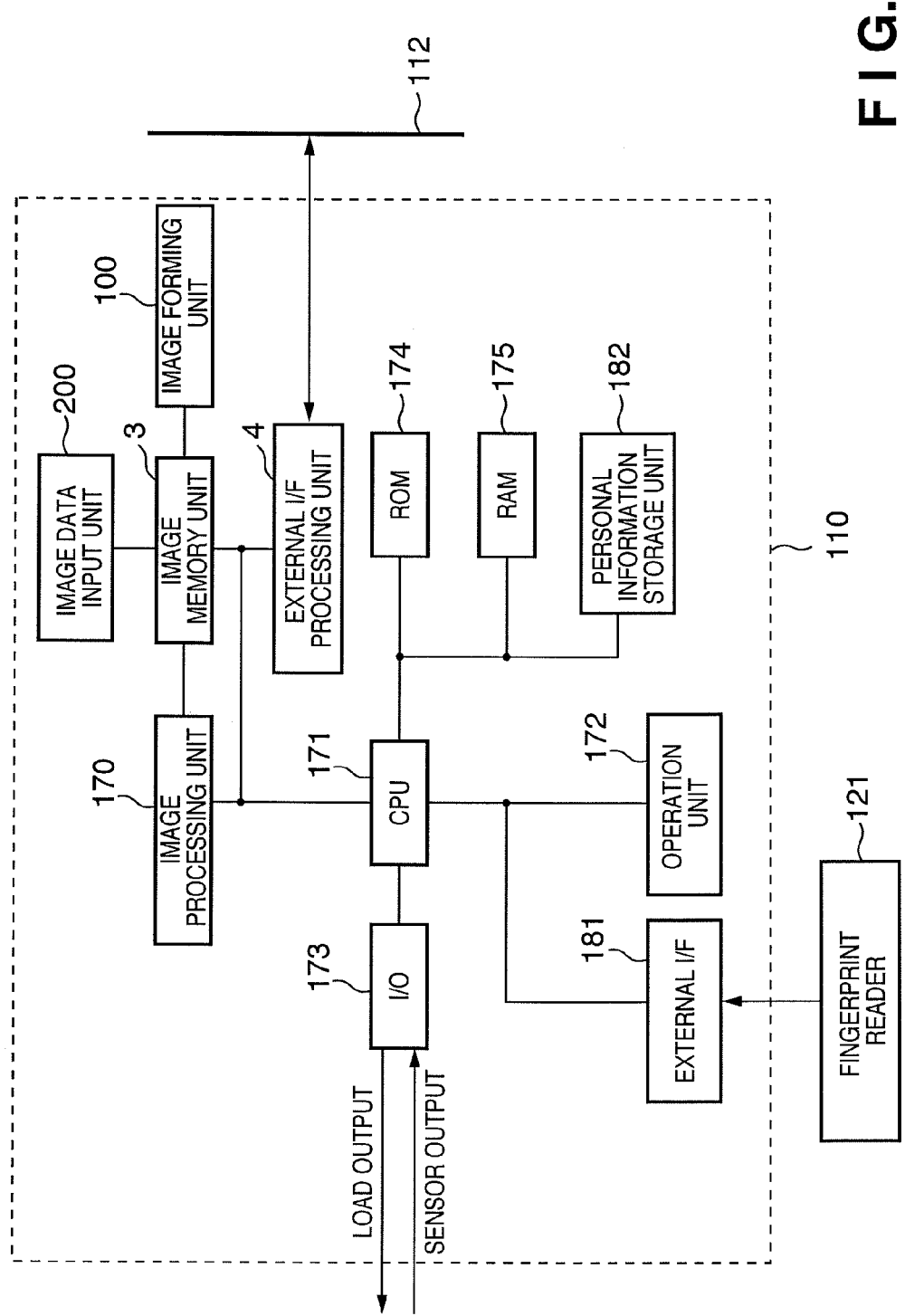
FIG. 9 is a control block diagram of the image forming apparatus.

The image forming apparatus comprises the operation unit 172 (FIG. 9). The operation unit 172 includes buttons to input operations and a display device to display an operation input result and is used by the user to operate the image forming apparatuses 107, 108, and 110. In the operation unit 172, the user designates a location where data to be printed is present by a URL. Until this input is done, the image forming apparatus is set in an input wait state. When a URL is input, the structure of the input URL is analyzed to specify the address of the server that holds the desired data and the location of the data in the server. In this embodiment, the data to be acquired is present in the print server 102.

A HEAD command for the data to be acquired is issued to the print server 102. The HEAD command is transmitted to the print server 102 through an external interface (I/F) processing unit 4 and network 112.

Upon receiving the HEAD command, the print server 102 generates format information corresponding to the HEAD command on the basis of information associated with the designated data and transmits the format information to the image forming apparatus of the request source through a network interface 301 (FIG. 10) and network 112. Upon receiving the format information from the print server 102, the image forming apparatus extracts "content-type" information from the format information from the print server 102 and stores the "content-type" information in an image memory 3 (FIG. 9).

Next, a GET command for the data to be acquired is issued to the print server 102. The GET command is issued to the print server 102 through the external interface processing unit 4 and network 112.

The print server 102 transmits the data designated by the GET command to the image forming apparatus through the network interface 301 and network 112.

Upon receiving a reply from the print server 102, the image forming apparatus stores the image data in the image memory 3 (FIG. 9) on the basis of the data received from the print server 102.

When "content-type" stored in the image memory 3 indicates a JPEG image, a CPU 171 executes setting of image processing for a JPEG image in an image processing unit 170 by overall control. In a UCR circuit (not shown), the UCR is set to 80%. A pulse width modulation (to be referred to as "PWM" hereinafter) circuit (not shown) is set to execute laser exposure control and form dots on a photoconductive drum at a frequency $\frac{1}{2}$ the pixel clock. Since a black component is extracted from a JPEG image at a UCR of 80%, an image with excellent image tonality to change black to another color can be generated. In addition, an image with excellent image tonality can be obtained because PWM is executed at a $\frac{1}{2}$ frequency.

Except the JPEG format, the CPU 171 executes setting for a GIF image in the image processing unit 170 by overall control. More specifically, in the UCR circuit (not shown), the UCR is set to 100%. The PWM circuit (not shown) is set to execute PWM at a frequency equal to a clock signal (not shown).

Since a black component is extracted from a GIF image at a UCR of 100%, a light gray image is formed by only black toner. Hence, a problem in an image generated by combining CMYK, i.e., a problem that a gray image is formed not by pure black, can be avoided.

Since PWM is executed at the same frequency as the supplied clock signal (not shown), a high-resolution image with unnoticeable jaggies can be formed.

For tone correction data of the image, a JPEG lookup table (to be referred to as a "LUT" hereinafter) that places priority on tone reproducibility is stored in a nonvolatile memory (not shown) as PWM modulation correction data. For a GIF image with priority being placed on the resolution, it is effective to store tone correction data different from that for a JPEG image in the JPEG LUT with priority being placed on tone reproducibility and selectively use the tone correction data.

(Printing of Data with ID Information)

Procedures of adding ID information to document data created by the personal computer 101 and printing the data will be described next.

Figure 4:
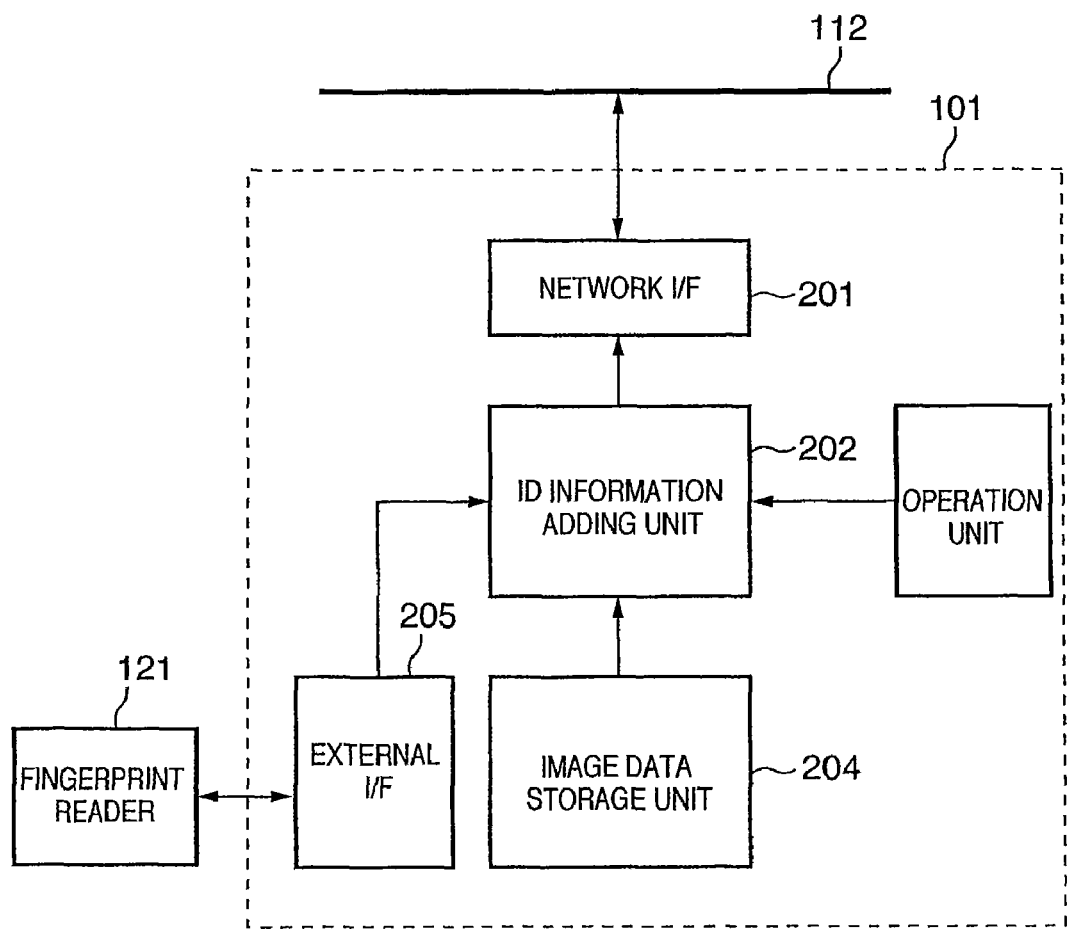
FIG. 4 is a block diagram for explaining an arrangement to add ID information in a personal computer 101.
Figure 5:
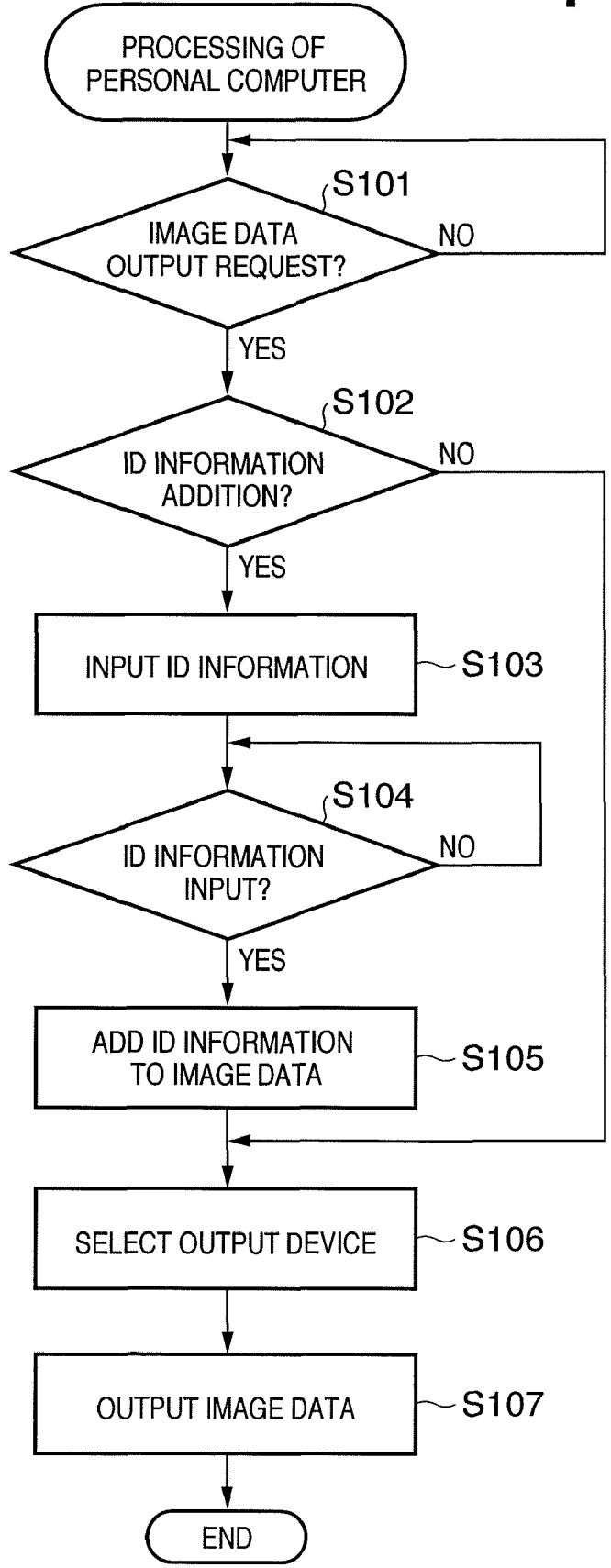
FIG. 5 is a flowchart for explaining a sequence of adding ID information in the personal computer 101.

FIG. 4 is a block diagram for explaining an arrangement to add ID information in the personal computer 101. FIG. 5 is a flowchart for explaining a sequence of adding ID information in the personal computer 101.

When an image data output request (S101) is received (YES in step S101), the personal computer 101 asks the user whether to add ID information (S102). If the user requests no ID information addition (NO in step S102), the processing advances to step S106 to select the output device (image forming apparatus) and output image data to the print server 102.

If the user requests ID information addition (YES in step S102), ID information (fingerprint) is input from the fingerprint reader 121 (S103).

When the ID information is input (YES in step S104), the personal computer 101 receives the ID information from the fingerprint reader 121 through an external I/F 205 as fingerprint feature amount data (S104).

The received ID information is added to the output image (image data) extracted from an image data storage unit 204 by an ID information adding unit 202 in the personal computer 101 (S105). The ID information can be contained in, e.g., an image formation command to cause the image forming apparatus to process image data as a print target output from the personal computer 101 or 109 in accordance with a print start command.

After that, an image forming apparatus serving as an output device is selected (a domain address indicating an address on the network is designated) in step S106, and the image data and image formation command are output to the print server 102 through a network I/F 201 (S107).

(Determination of ID Information in Print Server 102)

Figure 6:
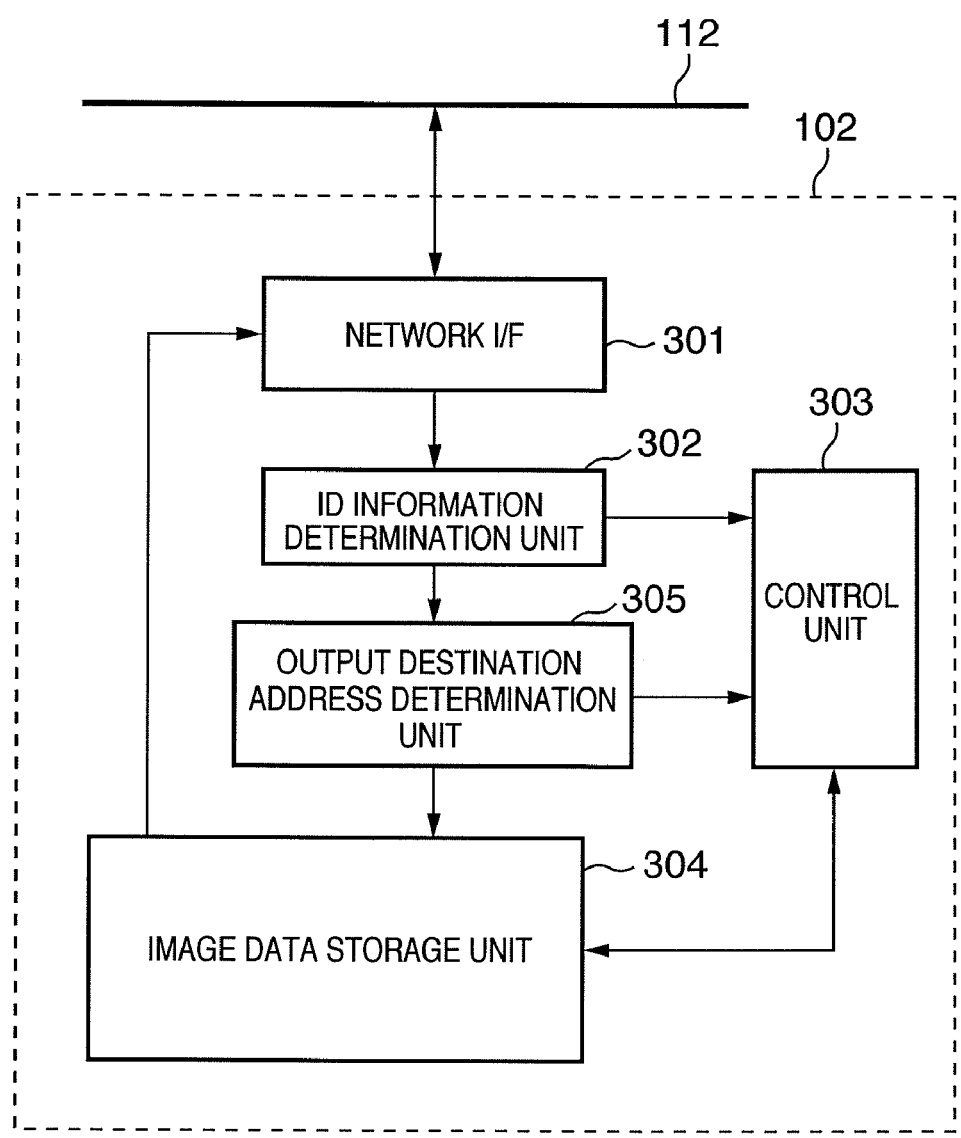
FIG. 6 is a block diagram for explaining an arrangement to determine ID information in a print server 102.
Figure 7:
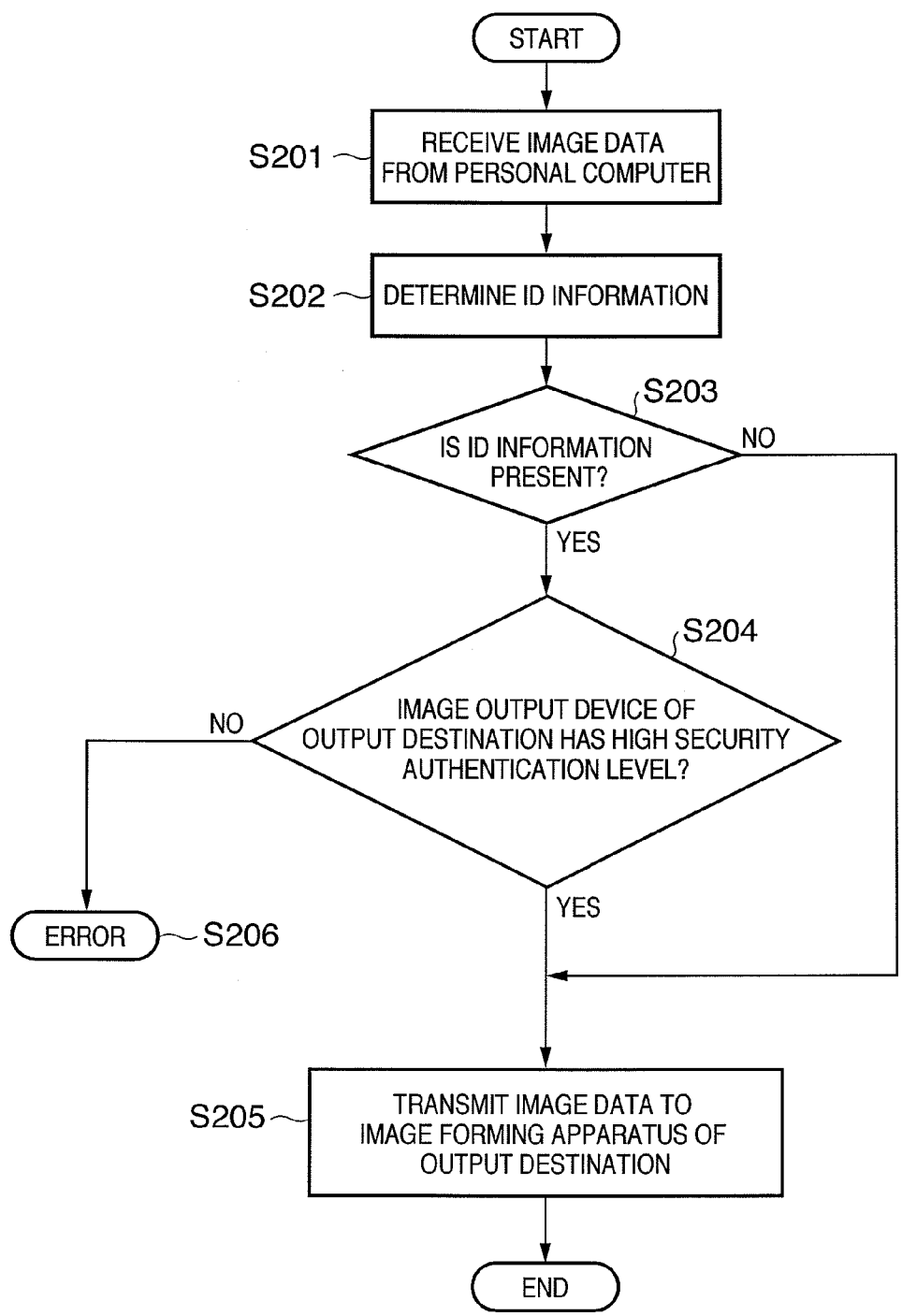
FIG. 7 is a flowchart for explaining a sequence of determining ID information in the print server 102.

FIG. 6 is a block diagram for explaining an arrangement to determine ID information in the print server 102. FIG. 7 is a flowchart for explaining a sequence of determining ID information in the print server 102.

The print server 102 receives image data from the personal computer 101 through the network I/F 301 (S201). The received image data is transmitted to an ID information determination unit 302 to determine whether ID information is added to the image data (S202). If no ID information is added to the transmitted image data (NO in step S203), the processing advances to step S205 to notify a control unit 303 of the absence of added ID information. The control unit 303 temporarily stores the image data in an image data storage unit 304 and then transfers the image data to the image forming apparatus of the output destination designated by a domain address determined by an output destination address determination unit 305 (S203 and S205).

If ID information read by the fingerprint reader 121 is added to the image data (YES in step S203), the processing advances to step S204 to notify the control unit 303 of the presence of added ID information. The control unit 303 determines the authentication scheme (security authentication level, e.g., whether the output device has an ID information input device to authenticate ID information and allow ID information authentication) of the authentication scheme of the output destination designated by a domain address determined by the output destination address determination unit 305. If the image forming apparatus selected as the output destination has, e.g., the fingerprint reader 121, the image data is temporarily stored in the image data storage unit 304. Then, the image data (if ID information and output restriction information are contained in the image formation command, the image data contains these pieces of information) is transmitted to the image forming apparatus of the output destination designated by the domain address determined by the output destination address determination unit 305 (S204 and S205). If the image forming apparatus selected as the output destination has no fingerprint reader 121 or an authentication scheme different from the fingerprint reader 121, the image data is temporarily stored in the image data storage unit 304. The image data (if ID information and output restriction information are contained in the image formation command, the image data contains these pieces of information) is not transmitted to the image forming apparatus of the output destination designated by the domain address determined by the output destination address determination unit 305, and error processing is executed (NO in step S204).

In the above description, the print server 102 has been exemplified. However, the above-described function may be imparted to the personal computer 101 to control transmission to the image forming apparatus 110.

The above-described function may be imparted to another image forming apparatus equivalent to the image forming apparatus 110 having the fingerprint reader 121 in place of the print server 102 or personal computer 101 to control transmission to the image forming apparatus 110.

When data on the print server 102 should be designated from the image forming apparatus side and printed, the following procedures are executed. The location of data on the print server 102 is designated by a designation format called a URL to designate the location where the data is held. The HTTP client issues an information transfer request to the print server 102 in accordance with the input of the URL.

Assume that the host name of the print server 102 is "host.co.jp", and the location of data as an acquisition target on the print server is "/pub/image.GIF". In this case, the HTTP client issues a HEAD command corresponding to "/pub/image.GIF" to the server "host.co.jp" by transmitting a URL "http://host.co.jp/pub/image.GIF" to the print server 102.

Upon receiving the HEAD command, the print server 102 transmits, as a reply to the HEAD command, ID information and output restriction information to the HTTP client that has issued the HEAD command together with the format information of the data of "/pub/image.GIF".

Upon receiving the reply to the HEAD command, the HTTP client issues a GET command corresponding to "/pub/image.GIF" to the server "host.co.jp".

Upon receiving the GET command, the print server 102 transmits, as a reply to the GET command, the data of "/pub/image.GIF" to the HTTP client that has issued the GET command.

Upon receiving the reply to the GET command, the HTTP client can receive the data of format information "/pub/image.GIF" and output restriction information which are received as the reply to the HEAD command and process the received data.

In this way, the HTTP client can acquire designated data which is stored in the designated print server 102 together with the associated information of the data on the basis of the URL input from the operation unit 172.

The print server 102 returns the format information attached to the document and the output restriction information. Hence, the image forming apparatus causes the CPU 171 to determine whether to permit printing on the basis of, e.g., the output restriction information. If the designated image forming apparatus has no means such as an ID information authentication unit for holding security setting, the image data is not transmitted to the image forming apparatus. Error processing is executed, and the image data is not transmitted (S206).

(Fingerprint Authentication in Image Forming Apparatus)
(Arrangement of Image Forming Apparatus)

Figure 8:
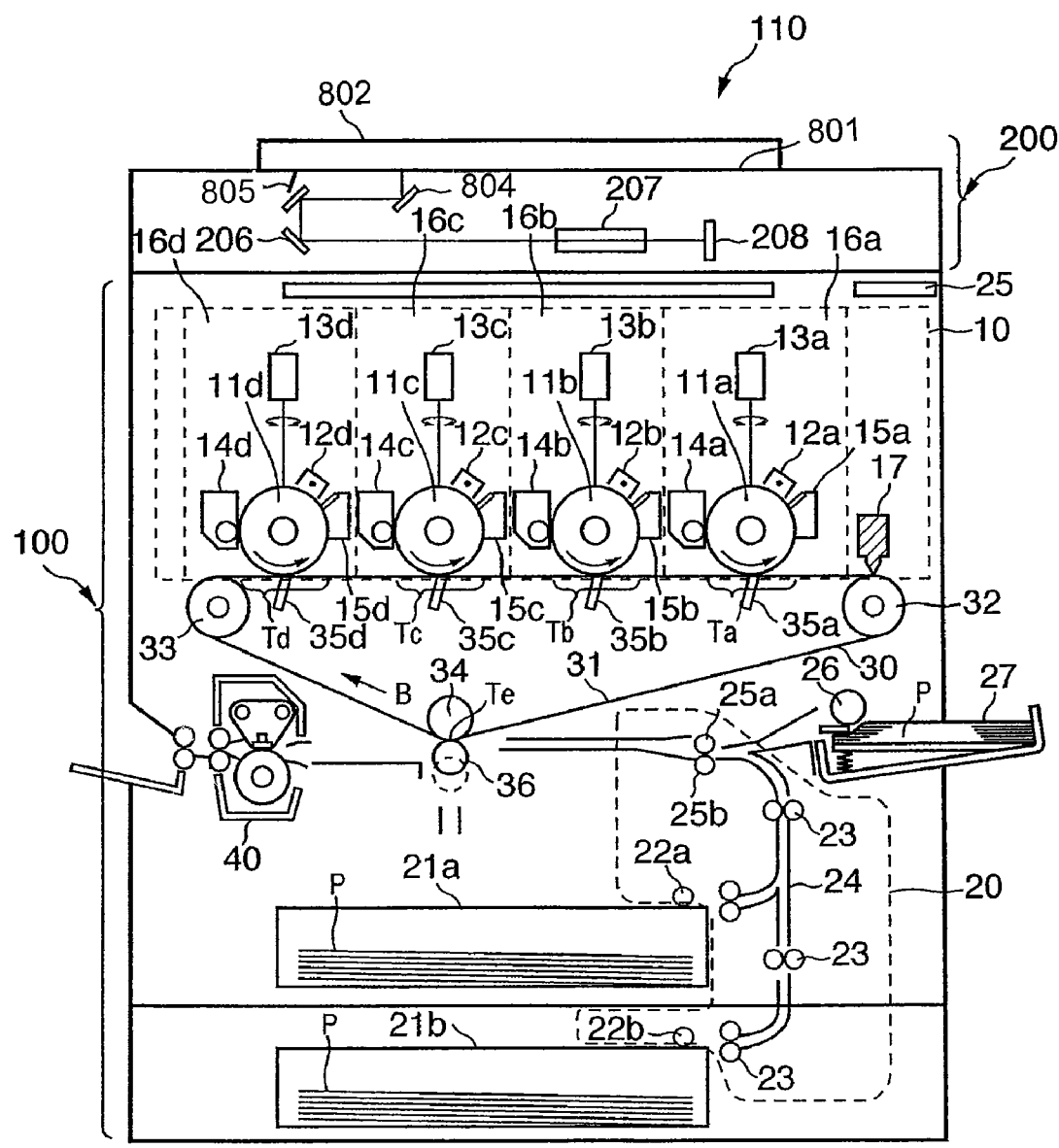
FIG. 8 is a sectional view for explaining a detailed arrangement of an image forming apparatus.

ID information authentication and image formation processing in the image forming apparatus 110 will be described next. FIG. 8 is a sectional view of the image forming apparatus 110 according to an embodiment of the present invention. In the example shown in FIG. 8, an image data input unit 200 is physically integrated with the image forming apparatus 110. This is merely an example, and the image data input unit 200 may be separated from the image forming apparatus.

In the image data input unit 200, a platen glass 801 serves as a document table. A scanner 802 includes a document illumination lamp (not shown) and a scan mirror (not shown). When image reading processing starts, the scanner 802 is reciprocally scanned in a predetermined direction. Reflected light from a document is guided to a lens 207 through scan minors 804, 805, and 206. A CCD sensor in an image sensor unit 208 forms an image of light transmitted through the lens 207. An ADF (Automatic Document Feeder) or platen cover (not shown) may be attached to the image data input unit 200.

An image forming unit 100 includes four stations (stations 16a to 16d with the same arrangement are juxtaposed) to form a toner image, a feed unit 20 to feed a printing medium, an intermediate transfer unit 30 to transfer the toner image to the printing medium, a fixing unit 40 to fix the toner image transferred onto the printing medium by heat and pressure, and a control unit 25 to entirely control authentication processing and image formation processing in the image forming apparatus.

In the arrangement shown in FIG. 8, four stations are provided as a unit to form a toner image. However, the present invention is not limited to this. For example, the present invention can also be applied to an arrangement including one photoconductive drum.

Each unit will be described next in detail. In the stations 16a to 16d of the image forming unit 100, photoconductive drums 11a to 11d each serving as an image carrier are supported to be rotatable about the center and rotated in the directions of arrows. Primary chargers 12a to 12d, optical systems 13a to 13d, and developing units 14a to 14d are arranged in the rotational direction to face the outer circumferential surfaces of the photoconductive drums 11a to 11d, respectively. The primary chargers 12a to 12d apply charges in a uniform change amount to the surfaces of the photoconductive drums 11a to 11d. The optical systems 13a to 13d expose the photoconductive drums 11a to 11d with light beams such as laser beams modulated in accordance with a print image signal, thereby forming electrostatic latent images. The developing units 14a to 14d which store developing powders (toners) of four colors: yellow, cyan, magenta, and black develop the electrostatic latent images to toner images. Downstream image transfer regions Ta to Td to transfer the developed visible images to an intermediate transfer body, cleaning units 15a to 15d clean the drum surfaces by scraping toners remaining on the photoconductive drums 11a to 11d without being transferred to the transfer member. With the above-described process, image formation by toners is executed.

The feed unit 20 includes cassettes 21a and 21b and manual feed tray 27 to store printing materials P, pickup rollers 22a, 22b, and 26 to feed each of the printing media (printing materials) P from a cassette or manual feed tray, a feed roller pair 23 and feed guide 24 to convey the printing material P fed from the pickup rollers to registration rollers, and registration rollers 25a and 25b to feed the printing material P to a secondary transfer region Te in accordance with the image forming timing of the image forming unit.

The intermediate transfer unit 30 will be described next in detail. An intermediate transfer belt 31 (the material is, e.g., PET (polyethylene terephthalate) or PVdf (polyvinylidene fluoride)) is looped over a driving roller 32 to transfer driving to the intermediate transfer belt 31, a tension roller 33 to apply an appropriate tensile force to the intermediate transfer belt 31 by biasing of a spring (not shown), and an idler roller 34 which faces the secondary transfer region Te via the belt. A primary transfer plane is formed between the driving roller 32 and the tension roller 33. The driving roller 32 prevents slip of the belt by a several-mm thick rubber coating (urethane or chloroprene) on the surface of a metal roller. The driving roller 32 is rotated by a pulse motor (not shown). Primary transfer blades 35a to 35d are arranged on the reverse surface of the intermediate transfer belt 31 in the primary transfer regions Ta to Td where the photoconductive drums 11a to 11d oppose the intermediate transfer belt 31. A secondary transfer roller 36 is arranged to face the idler roller 34. The secondary transfer region Te is formed by nip of the intermediate transfer belt 31. The secondary transfer roller 36 is pressed against the intermediate transfer body by an appropriate pressure. A cleaning unit (not shown) to clean the image forming surface of the intermediate transfer belt 31 is arranged on the intermediate transfer belt 31 downstream the secondary transfer region Te. The cleaning unit includes a cleaner blade (not shown; the material is, e.g., polyurethane rubber) and a waste toner box (not shown) to store waste toner.

The control unit 25 includes a control board (not shown) to control the operation of the mechanism in each unit and a motor drive board (not shown).

The fixing unit 40 heats and presses the printing material P with an image being transferred in the secondary transfer region Te, thereby fixing the image.

The remaining image forming apparatuses 107 and 108 also have the same arrangement as described above.

(Control Block of Image Forming Apparatus)

Figure 12:
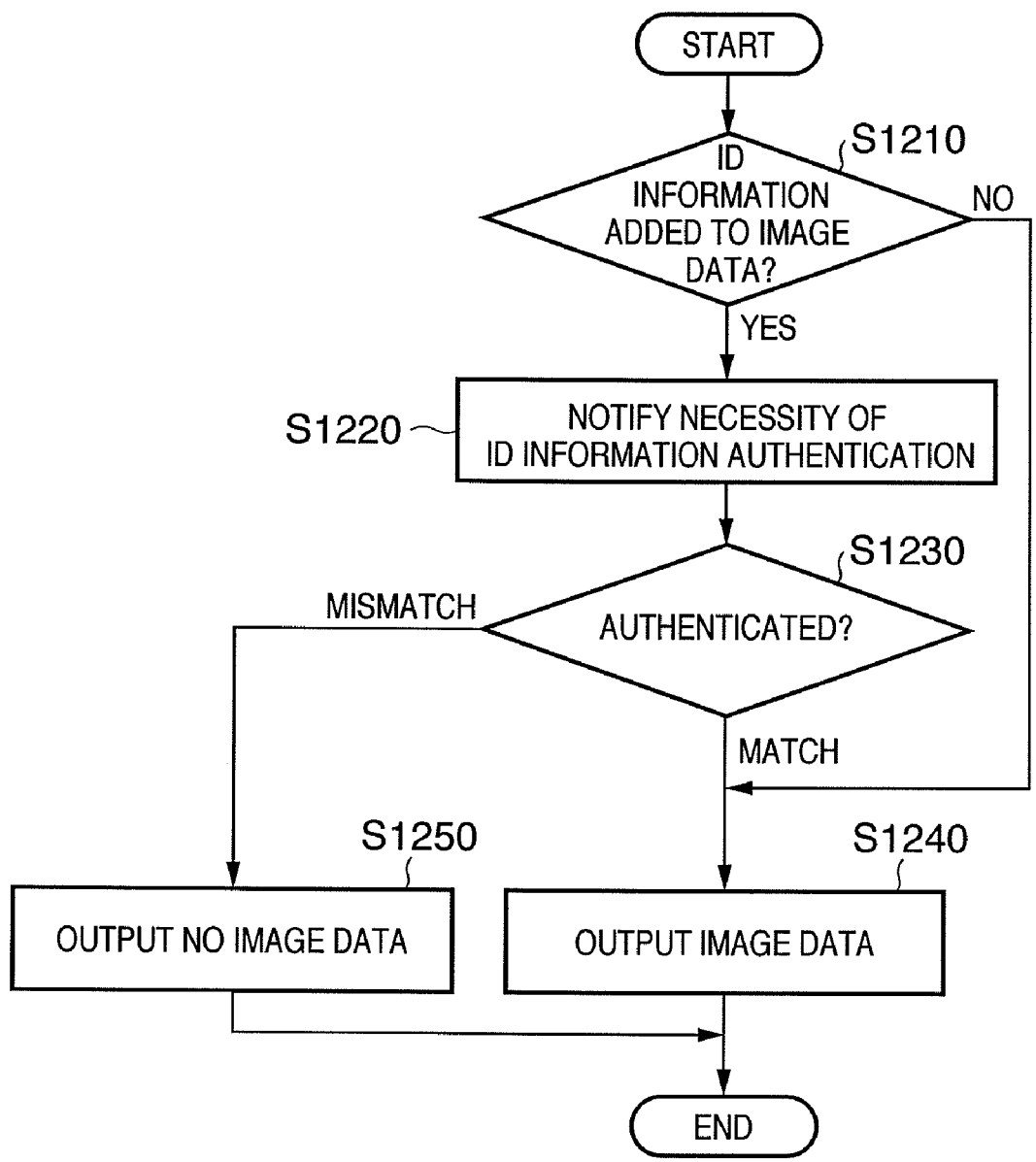
FIG. 12 is a flowchart for explaining the outline of the flow of processing in an image forming apparatus.

FIG. 9 is a control block diagram of the image forming apparatus 110. FIG. 12 is a flowchart for explaining the outline of the flow of processing in the image forming apparatus 110. The CPU 171 executes basic control of the image forming apparatus 110. A ROM 174, RAM 175, and input/output (I/O) port 173 are connected to the CPU 171 through address and data buses. Outputs from various kinds of loads such as a motor and clutch (not shown) to control the image forming apparatus 110 and a sensor output to detect the position of a printing material are input to the input/output port 173.

The CPU 171 executes the image forming operation by sequentially controlling input/output through the input/output port 173 in accordance with the contents of the ROM 174. The CPU 171 to control the operation of the entire image forming apparatus is connected to the units through the system bus or serial bus of the CPU 171 to transmit/receive various kinds of data.

The network 112 is an electrical communication line including the Internet and LAN, which connects the image forming apparatuses to the print server 102 to transmit/receive various kinds of data between the apparatuses. The ROM 174 stores programs to be executed by the CPU 171, and the RAM 175 is used as a work area to temporarily store various kinds of data during the operation of the CPU 171. At least part of the programs may be stored in any other storage unit such as a hard disk (not shown) (to be referred to as an "HDD" hereinafter). Image data and the like may be stored in the HDD.

The operation unit 172 is connected to the CPU 171. The CPU 171 executes display control to display various data or the status of the image forming apparatus on a display unit on the operation unit 172 and control of operations based on operation inputs input from the key input unit (not shown) of the operation unit 172. The operator instructs the CPU 171 to switch the image forming operation mode or display through the key input unit. The CPU 171 displays, on the display unit, the status of the image forming apparatus 110 or indications related to operation mode settings by key input.

The image processing unit 170 which processes an electrical signal converted by the image sensor unit 208 and the image memory unit 3 which stores a processed image are connected to the CPU 171.

The image data input unit 200, external I/F processing unit 4, and image forming unit 100 are connected to the image memory unit 3.

A document image read by the image data input unit 200 undergoes predetermined image processing and is sent to and stored in the image memory unit 3. Image data input to the external I/F processing unit 4 through the network 112 or generated by the computer 101 has already undergone image processing by the computer 101 and is therefore directly sent to the image memory unit 3. The image data sent from the image data input unit 200 or external I/F processing unit 4 to the image memory unit 3 is sent to the image forming unit 100. The image forming unit 100 forms an image based on the image data on the printing material P.

The external I/F processing unit 4 controls, through the network 112, communication with another device connected to the network 112. Image data sent from the print server 102 is received by the image forming apparatus 110 through the external I/F processing unit 4. Under the control of the CPU 171, the image processing unit 170 determines whether ID information is added to the image data. If no ID information is added (NO in step S1210), the flow advances to image formation processing.

If ID information is added to the image data (YES in step S1210), the CPU 171 notifies the user of the necessity of ID information authentication (S1220). The image data is not output unless user authentication is not permitted by the CPU 171.

For example, assume that ID information is input from the fingerprint reader 121 connected to the personal computer 101 and added to image data.

The ID information added to the image data is stored in a personal information storage unit 182. Upon determining that the ID information input from the fingerprint reader 121 connected to the image forming apparatus 110 does not match the ID information stored in the personal information storage unit 182 ((mismatch) in step S1230), the CPU 171 controls the image forming apparatus 110 not to process the image data (S1250). Only when the two pieces of ID information match each other ((match) in step S1230), the CPU 171 controls the image forming apparatus 110 to process and output the image data (S1240).

Upon determining by authentication that the user is permitted to print the document, the CPU 171 can display, on the display screen of the operation unit 172, e.g., a message "Authentication result is OK. Printing is enabled" by controlling the operation unit 172.

(Control Based on Output Restriction Information)

Upon determining that the ID information stored in the personal information storage unit 182 matches the ID information input from the fingerprint reader 121 connected to the image forming apparatus 110, the CPU 171 controls the image forming apparatus to process the image data. At this time, the CPU 171 can control the image forming apparatus 110 to limit the print operation mode (printing function) of the image forming apparatus 110 on the basis of the output restriction information of the image data acquired from the print server 102.

For example, assume that the contents of the output restriction information acquired from the print server 102 indicate settings to permit only monochrome printing. In this case, the CPU 171 controls image data processing to permit the print operation in the monochrome print mode and inhibit the print operation in the color mode.

(Printing Based on Information of Original Document Image Acquired from Print Server 102)

A case will be described in which the image data input unit 200 is caused to read document image data, and original document image data is acquired from the print server 102 and printed. This printing can prevent, e.g., a problem that arises when document data that is once processed by the image forming apparatus 110 is input from the image data input unit 200 again and copied because security information is not reflected on image formation by copy.

When the contents of the output restriction information indicate setting of a mode to acquire and print original document image data stored in the print server 102, the CPU 171 can control the image forming apparatus 110 to request the print server 102 to transmit the image data and acquire and print it. In this case, to request the original image data of the print server 102, the CPU 171 issues and transmits a HEAD command to the print server 102 to designate a URL address where the document image data is stored. As the URL address, for example, a URL input from the operation unit 172 for the first time to acquire the original document image data is held in the image memory unit 3 and used again in requesting the print server 102 to transmit the document image data.

The image forming apparatus 110 receives the document image data (this data corresponds to the original image data of the document image input from the image data input unit 200) as original data and stores the document image data in the image memory unit 3. At this time, the CPU 171 can control the image forming apparatus 110 to form an image on the basis of not the document image read from the image data input unit 200 but the document image data newly sent from the print server 102 and stored in the image memory unit 3.

To process the document image data, the CPU 171 acquires user's ID information again from the fingerprint reader 121 connected to the image forming apparatus 110 to newly collate it with user's ID information stored in the personal information storage unit 182 in advance. If the pieces of ID information match each other, the CPU 171 controls the image forming unit 100 to execute image formation processing based on the document image data newly sent from the print server 102 and stored in the image memory unit 3.

According to the above-described processing, in reading document data, which is once processed by the image forming apparatus 110, again from the image data input unit 200 and copying it, the original document image data is acquired from the URL address to acquire the data itself from the original document image data, and simultaneously, user's ID information is authenticated. That is, since data collation and authentication of user's personal information are executed in synchronism, security information such as ID information can be prevented from being unreflected on image formation in copy.

At this time, the CPU 171 may execute control to permit access to the print server 102 only when the ID information read by the fingerprint reader 121 matches the stored ID information.

If image formation on the printing material P is inhibited by the contents of the output restriction information although the pieces of ID information match each other, the CPU 171 can display the image data by using the display unit provided on the operation unit 172 of the image forming apparatus 110.

Alternatively, encrypted image data is stored in the image memory unit 3 in advance. The CPU 171 may control the image forming apparatus 110 to permit decoding of the encrypted image data on the basis of the output restriction information when the pieces of ID information match each other and inhibit decoding when the pieces of ID information do not match each other.

When the pieces of ID information match each other, the CPU 171 may permit to change the contents of the original document image data in the print server 102 or change collateral conditions such as the print size and resolution. When the pieces of ID information do not match each other, the CPU 171 may inhibit change of collateral conditions. In addition, if the pieces of ID information do not match each other, the CPU 171 may inhibit the change to prevent image data acquired from the print server 102 from being intentionally or carelessly changed.

According to this embodiment, image formation corresponding to the security environment of the output destination can be executed on the basis of ID information for personal authentication of the user and output restriction information to control output of image data.

Second Embodiment

The second embodiment of the present invention will be described. In this embodiment, the disclosure range of contents is managed by output restriction information for a part (e.g., a part of one page or some of a plurality of pages) such as a specific page or region of data used as an original document image.

A fingerprint reader 121 is connected to an image forming apparatus 110 via an external I/F 181. In executing image formation processing, the user is prompted to authenticate ID information, as in the first embodiment. If it is determined that pieces of ID information match each other, a CPU 171 can control the image forming apparatus to execute partial image formation and not to output at least part of image data. In this case, at least part of the normal copy operation may be permitted. Even in acquiring original document image data from a server 102, restriction may be placed such that only at least part of the data can be acquired. In this case, the CPU 171 restricts the contents designated for a page or specific region and manages the disclosure range of the contents for each document in accordance with contents specified by output restriction information.

For example, the disclosure range can arbitrarily set such that a part (e.g., only a text data portion) of document data containing a document described in a postscript language or text or a document containing both images and texts is disclosed.

When a highly confidential document that describes the outline of a project in a company is to be printed as image data (document data), the disclosure range of image formation can be set in accordance with the access right of a user. In this case, a security level is set for each page or specific region of the original image data (document data) stored in the print server 102. For example, a medium level, i.e., rank B is set for pages P1 to P3 of the confidential document, and a higher level, i.e., rank A is set for page P4. In storing the image data (document data) in an image memory 3, information about the security level is stored in the memory 3 as output restriction information together with the image data (document data).

In outputting the image data, the CPU 171 executes user authentication on the basis of ID information. If the security level of the user allows reference to data of rank A, the CPU 171 outputs, e.g., the above-described document pages (P1 to P4) of ranks A and B. If the security level of the user is rank B, the CPU 171 controls the image forming apparatus to output only the pages (P1 to P3) set to rank B.

A security level can be set not only to set a level corresponding to the access right of a user. For example, the disclosure range can be designated to output only data of a specific attribute such as text data or set a print range (pages P1 to P3) or decoding range of encrypted image data, as described above.

As an attribute of image data (document data), an HTML document is present, which contains a plurality of formats, e.g., image data such as photos of JPEG format and text data. The CPU 171 can control the image forming apparatus to, upon determining that the pieces of ID information do not match each other, permit printing of only the text data of a document portion and inhibit output of the image data portion of a photo of JPEG format, and if the pieces of ID information match each other, output the image data portion of JPEG format, too.

To inhibit display of only a part or specific region of a page, the CPU 171 can process the part by a method different from that of other disclosure enable regions by executing shading, filling the portion with black toner to make it invisible, or executing masking by replacing the image data itself with blank data. The CPU 171 can also control the image forming apparatus to execute printing while reducing the resolution of the image data portion of JPEG format to a very low resolution.

A disclosure range is not always set for a part of one image data (document data). When image data (document data) is revised to a new version, a disclosure range can be set for each of the new and old image data (document data).

For example, a disclosure range can be set by output restriction information to permit disclosure of only a predetermined revised portion of image data (document data) group that is revised a plurality of number of times. For image data (document data) of old version, the security level is reduced to the lowest level so that the original document image data (document data) can be acquired from the print server 102 without personal authentication. For predetermined and subsequent revisions, setting can be done such that the original document image data (document data) is acquired from the print server 102 and printed in accordance with the predetermined security level.

To inhibit printing of a document that is being revised, output restriction information can be set such that only display is permitted for original document image data (document data) of the latest version, and printing and change of contents are inhibited.

In this case, for example, user personal authentication is done on the basis of ID information. The disclosure range (display enable range) may be limited in accordance with the security level of the user. If the pieces of ID information do not match each other, display can be inhibited.

According to the image forming apparatus of this embodiment, an image can be formed while controlling the disclosure range to, e.g., a specific page or region of image data in accordance with the security level of a user on the basis of ID information authentication and disclosure range setting of output restriction information.

Third Embodiment

The third embodiment of the present invention will be described next. In this embodiment, the number of times of printing or the number of times of acquisition of original document image data to be acquired from a print server 102 is limited in accordance with output restriction information.

The arrangements of an image forming apparatus 110 and the like connected to a network 112 are the same as in the first and second embodiments. A personal computer 101 and the like to generate image data, a print server 102 which stores original document image data in an image data storage unit 304, an image forming apparatus 107 (this apparatus authenticates a user by inputting, e.g., a password from the operation unit) which prints image data on the basis of ID information and output restriction information, an image forming apparatus 110 (a fingerprint reader 121 is connected to this apparatus so the security protection level is higher than the image forming apparatus 107), and the like are connected to the network 112.

When the print server 102 selects the image forming apparatus 107 as the output destination, and ID information using fingerprint feature amount data input from the fingerprint reader 121 is added in the personal computer 101 shown in FIG. 4, the image data may be sent to even the image forming apparatus 107 which has a lower security protection level than the image forming apparatus 110 and can execute authentication on the basis of only key input from the operation unit (not fingerprint feature amount data but, e.g., password information).

Figure 10:
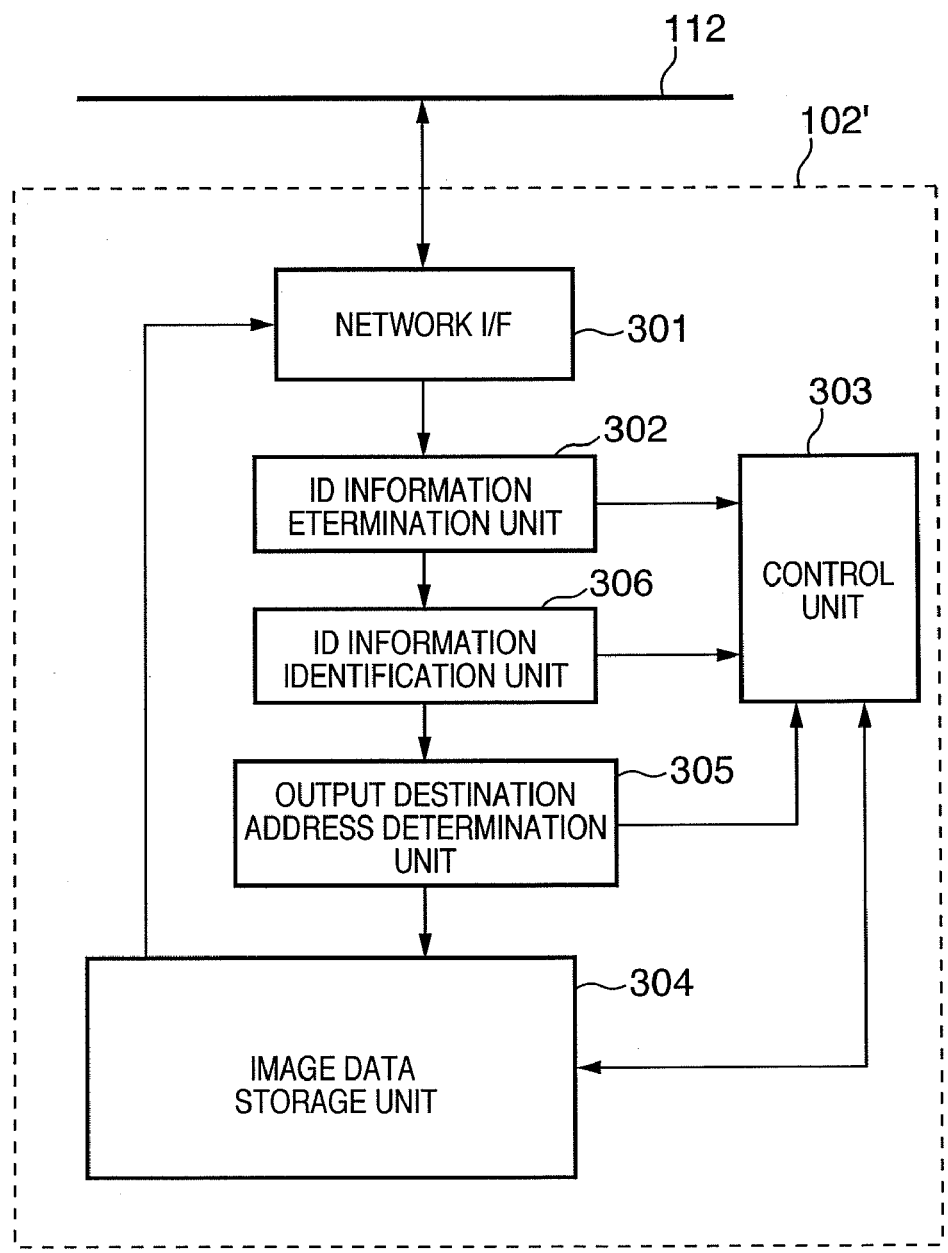
FIG. 10 is a block diagram showing the arrangement of a print server 102' according to the third embodiment of the present invention.

FIG. 10 is a block diagram showing the arrangement of a print server 102' according to the third embodiment of the present invention. The print server 102' in FIG. 10 is different from the print server 102 in FIG. 6 in that an ID information identification unit 306 is added (a description of common parts of the arrangements will be omitted). The ID information identification unit 306 functions as a means for identifying the contents of ID information added to image data (whether the ID information is based on fingerprint feature amount data or encrypted data about a password input from the operation unit). More specifically, the ID information identification unit 306 identifies the contents of ID information added to image data on the basis of the information amount of the ID information. Encrypted data input from the operation unit by key input has a smaller information amount that ID information created from fingerprint feature amount data. On the basis of this difference (difference in information amount), the ID information identification unit 306 identifies whether data added to image data as ID information is based on fingerprint feature amount data or encrypted data about a password input from the operation unit (identifies the security level).

Figure 11:
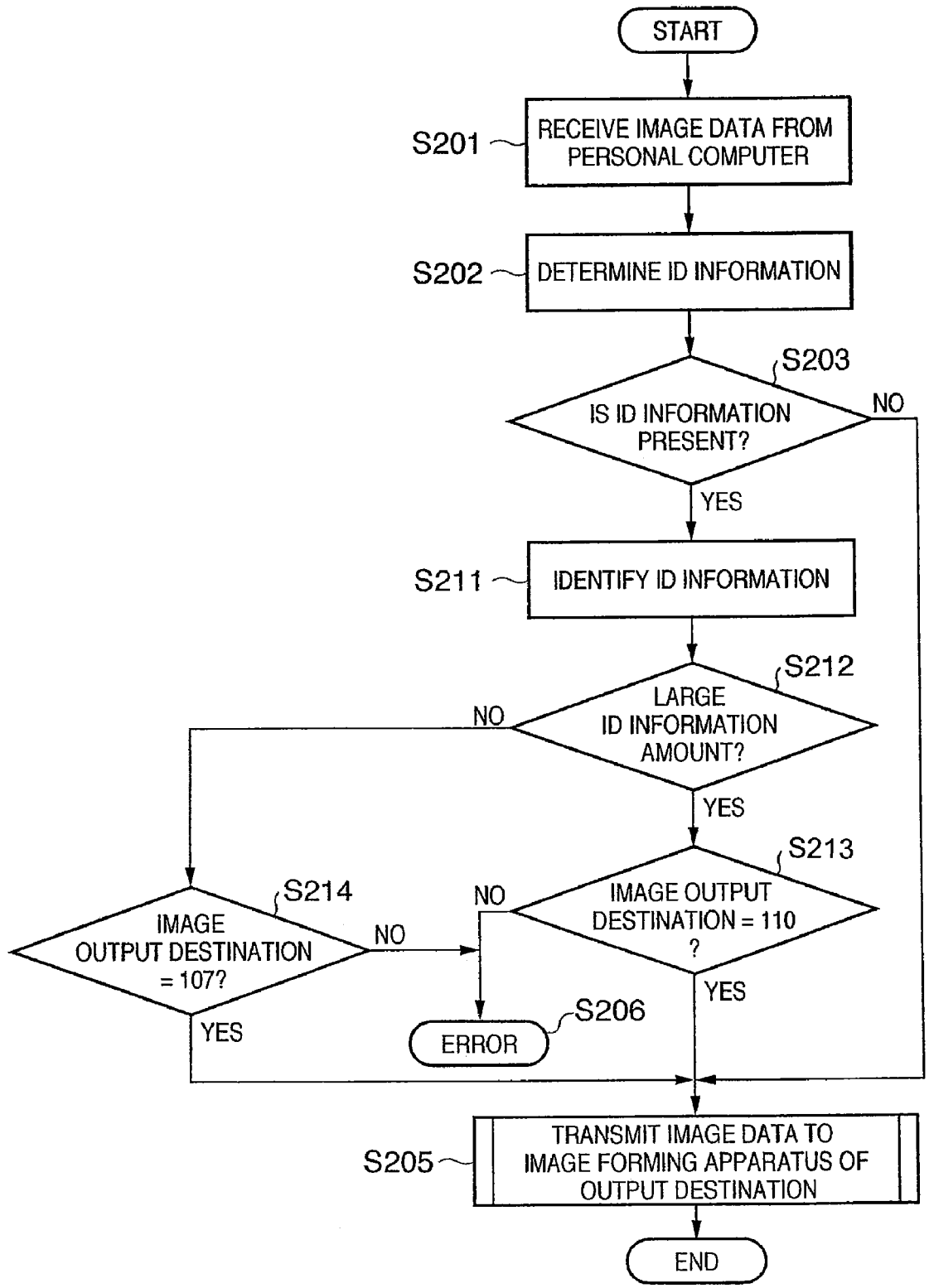
FIG. 11 is a flowchart for explaining the flow of processing of identifying ID information in the print server 102'.

FIG. 11 is a flowchart for explaining the flow of processing of identifying ID information in the print server 102'.

The print server 102' receives image data transmitted from the personal computer 101 or the like through a network I/F 301.

The received image data is transmitted to an ID information determination unit 302 to determine whether ID information is added to the image data (S202).

If no ID information is added to the transmitted image data (NO in step S203), the processing advances to step S205. The ID information determination unit 302 notifies a control unit 303 that no ID information is added to the image data. The control unit 303 temporarily stores the image data in an image data storage unit 304 and then transfers the image data to the image forming apparatus of the output destination designated by a domain address determined by an output destination address determination unit 305 (S203 and S205).

If ID information is added to the transmitted image data (YES in step S203), the processing advances to step S211. The ID information determination unit 302 notifies the control unit 303 that ID information is added to the image data. The ID information determination unit 302 transmits the image data to the ID information identification unit 306. The ID information identification unit 306 identifies the contents of the ID information in accordance with the information amount of the ID information added to the image data. If the ID information is identified to have a large information amount (ID information based on fingerprint feature amount data) (YES in step S212), the processing advances to step S213 to notify the control unit 303 that the ID information is based on fingerprint feature amount data. In this case, only when the output destination of the image data is designated to the image forming apparatus 110 capable of authenticating a fingerprint by using ID information input from the fingerprint reader 121 (YES in step S213), the output destination address determination unit 305 transmits the image data to the image forming apparatus 110 (S205).

If it is determined in step S213 that the image forming apparatus 110 is not designated as the output destination (NO in step S213), the image data is not transmitted, and error processing is executed (S206).

If the ID information is identified to have a small information amount (ID information based on encrypted data about a password input from the operation unit) (NO in step S212), the ID information identification unit 306 notifies the control unit 303 of it. Only when the output destination of the image data is designated to the image forming apparatus 107, the output destination address determination unit 305 transmits the image data to the image forming apparatus 107 (S205). If another output destination is designated (NO in step S214), the image data is not transmitted, and error processing is executed (S206).

As described above, if the level of the apparatus related to security authentication in the image forming apparatus of the output destination does not correspond to the information amount of ID information added to image data, the image data is not transmitted to the image forming apparatus. Hence, an image forming system with a higher security level can be built.

Various mathematical encryption methods have been proposed. To ensure the confidentiality of data, confidential document data may be distributed after encryption processing hard to decode. In this case, the confidentiality can be increased by a simple arrangement by accurately extracting authentication information contained in the encrypted confidential document data.

For example, encrypted confidential document data is printed on a paper sheet by a printing device and distributed. The user who has received the data causes the image data input unit 200 to read the encrypted confidential document data and convert it into image data. At this time, feature extraction processing is executed for the confidential document data read by the image data input unit 200 to extract authentication information. This processing is executed by the image processing unit 170 under the overall control of the CPU 171. The CPU 171 and image processing unit 170 determine on the basis of the presence/absence of ID information such as fingerprint information and the information amount of the ID information whether to decode the confidential document data.

For example, assume that encrypted original document image data with ID information, which is printed on a print output sheet, should be copied again by an image forming apparatus as a document image. The print output sheet (encrypted document image) is placed on the platen glass, and the image data input unit 200 reads the encrypted document and converts it into image data.

ID information can sufficiently be read even from the encrypted document image. However, the read resolution of the reading sensor of the image data input unit 200 and the print resolution of the image forming apparatus contain slight errors with respect to the design values. Hence, as the encrypted document image is repeatedly copied, the resolution error of the reading sensor, slight aberration of the sensor optical system, variations in image dots in printing by the image forming apparatus, and print scaling factor error are accumulated. When the copy is repeated a certain number of times, the encryption information of the encrypted image itself is lost, and the information changes.

When the copy of the encrypted document image is repeated a predetermined number of times or more, recorded information degrades, and the error rate in decoding becomes high. In this case, the quality of the reproduced image after decoding is very poor. In some cases, character information is garbled to another character information at random.

When the number of times of acquisition and copy of the original document image or encrypted document image is limited to a predetermined number of times by output restriction information, the problem of recognition error such as garbled characters can be solved.

In the image forming system, the image forming apparatuses 107, 108, and 110 notify the print server 102 of their security levels in activating the system. The print server 102 grasps the security level of each image forming apparatus.

The number of times of acquisition of original document image data may be defined in the output restriction information, and the print server 102 may store, for each original document, the number of times of information acquisition, i.e., information representing the user, the document acquired by the user, and the number of times of acquisition of the data from the print server 102.

For example, assume that the maximum number of times of acquisition of original information (original document image data) is defined as 10 in output restriction information. In this case, every time a user acquires the original document image data from the print server 102, the print server 102 that stores the original document accumulates the number of times of original document image data acquisition by the user, and stores the referable cumulative data in, e.g., the image data storage unit 304. If the maximum number of times of data acquisition is defined as 10 in the output restriction information of original document image data, and the cumulative number of times of data acquisition by the user is stored as 8 in the image data storage unit 304, it is determined that the user can acquire the data two more times.

For example, the "URL and file name of original document image data, maximum number of times of original document image data acquisition=10, current number of times of acquisition=8, and remaining number of times of acquisition=2" may be displayed on the display unit of the operation unit 172 in the image forming apparatus.

As described above, when the number of times of data acquisition by a user is associated with the output restriction information of original document image data in the print server 102 and stored, the number of times of access to highly confidential information, the number of times of data acquisition, and the user who has accessed the data can be grasped. It can be determined that, e.g., a single person has repeatedly acquired specific data a plurality of number of times. Hence, information for a trial calculation of data activity ratio or data leakage prevention can be provided.

According to the image forming system of this embodiment, if it is determined on the basis of the information amount of ID information that the security authentication level of the image forming apparatus of the output destination does not cope with the information amount of ID information added to image data, the image data is not transmitted to the image forming apparatus. Hence, an image forming system with a higher security level can be built.

Alternatively, an image can be formed by controlling original document image data on the basis of ID information authentication and restriction of the number of times of acquisition in output restriction information.

Other Embodiment

The object of the present invention can also be achieved by supplying a storage medium which records software program codes for implementing the functions of the above-described embodiments to a system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a flexible disk, hard disk, optical disk, magnetooptical disk, CD-ROM, CD-R, magnetic tape, nonvolatile memory card, ROM, and the like can be used.

The functions of the above-described embodiments are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2005-109222 filed on Apr. 5, 2005, which is hereby incorporated by reference herein.

What is claimed is:

1. An information processing apparatus which transmits, via a network, image data to be output from an image forming apparatus, comprising:
   an authentication information input portion which inputs authentication information of a user inputted by the user;
   an identifying unit that identifies an authentication method of the authentication information input by said authentication information input portion;

a first determination portion which determines whether an authentication portion of the image forming apparatus is adapted to authenticate the authentication method of the authentication information of the user input by said authentication information input portion; and a transmission controller which, (i) in a case where said first determination portion determines that the authentication portion is adapted to authenticate the authentication method of the authentication information of the user input by said authentication information input portion, controls data transmission so that data obtained by adding the authentication information of the user to the image data and output restriction information indicating whether or not to permit operation in a print mode of a predetermined color are transmitted to the image forming apparatus, and (ii) in a case where said first determination portion determines that the authentication portion is not adapted to authenticate the authentication method of the authentication information of the user input by said authentication information input portion, controls data transmission so that the image data is not transmitted to the image forming apparatus.

2. The apparatus according to claim 1, wherein the information processing apparatus is notified of the authentication method of the authentication portion of the image forming apparatus, and said first determination portion comprises an authentication information identification portion which identifies the authentication method of the authentication information on the basis of an information amount of the authentication information, and determines whether the authentication method of the authentication portion of the image forming apparatus matches the identified authentication method of the authentication information.

3. The apparatus according to claim 1, wherein the authentication method includes at least one of a fingerprint, retina, voice, and password of the user.

4. The apparatus according to claim 1, wherein the information processing apparatus is another image forming apparatus different from the image forming apparatus to which the image data is sent.

5. An information processing apparatus which receives authentication information of a user and image data to be output from an image forming apparatus via a network, comprising:

an identifying unit that identifies an authentication method of the authentication information of the user;

a first determination portion which determines whether an authentication portion of the image forming apparatus is adapted to authenticate the authentication method of the authentication information of the user received by the information processing apparatus; and a transmission controller which (i) in a case where said first determination portion determines that the authentication portion is adapted to authenticate the authentication method of the authentication information of the user received by the information processing apparatus, controls data transmission so that data obtained by adding the authentication information of the user to the image data and output restriction information indicating whether or not to permit operation in a print mode of a redetermined color are transmitted to the image forming apparatus, (ii) in a case where said first determination portion determines that the authentication portion is not adapted to authenticate the authentication method of the authentication information of the user received by the information processing apparatus, controls data transmission so that the image data is not transmitted to the image forming apparatus.

6. The apparatus according to claim 5, wherein the information processing apparatus is notified of the authentication method of the authentication portion of the image forming apparatus, and said first determination portion comprises an authentication information identification portion which identifies the authentication method of the authentication information received by the information processing apparatus on the basis of an information amount of the authentication information, and determines whether the authentication method of the authentication portion of the image forming apparatus matches the identified authentication method of the authentication information.

7. The apparatus according to claim 5, wherein the authentication method includes at least one of a fingerprint, retina, voice, and password of the user.

8. An image forming system comprising an image forming apparatus which outputs image data transmitted from an information processing apparatus via a network, the information processing apparatus comprising:

an authentication information input portion which inputs authentication information of a user inputted by the user;

an identifying unit that identifies an authentication method of the authentication information input by said authentication information input portion;

a first determination portion which determines whether an authentication portion of the image forming apparatus is adapted to authenticate the authentication method of the authentication information of the user input by said authentication information input portion; and a transmission controller which (i) in a case where said first determination portion determines that the authentication portion is adapted to authenticate the authentication method of the authentication information of the user input by said authentication information input portion, controls data transmission so that data obtained by adding the authentication information of the user to the image data and output restriction information indicating whether or not to permit operation in a print mode of a predetermined color are transmitted to the image forming apparatus, and (ii) in a case where said first determination portion determines that the authentication portion is not adapted to authenticate the authentication method of the authentication information of the user input by said authentication information input portion, controls data transmission so that the image data is not transmitted to the image forming apparatus, and the image forming apparatus comprising:

an authentication portion which inputs the authentication information of the user;

a second determination portion which determines whether the authentication information of the user input by the authentication portion matches the authentication information of the user included in the data transmitted by said transmission controller; and an image formation controller which outputs the image data when said second determination portion determines that the authentication information of the user input by the authentication portion and the authentication information of the user included in the data transmitted by said transmission controller match each other; and a restriction portion that restricts outputting of the image data by said image formation controller based on the output restriction information.

9. The system according to claim 8, wherein the information processing apparatus is notified of the authentication method of the authentication portion of the image forming apparatus, and said first determination portion comprises an authentication information identification portion which identifies the authentication method of the authentication information input by said authentication information input portion on the basis of an information amount of the authentication information input by said authentication information input portion, and determines whether the authentication method of the authentication portion of the image forming apparatus matches the identified authentication method of the authentication information.

10. The system according to claim 8, wherein the authentication method includes at least one of a fingerprint, retina, voice, and password of the user.

11. The system according to claim 8, wherein the information processing apparatus adds output restriction information to restrict output of the image data in the image forming apparatus, and said image formation controller controls the output of the image data on the basis of the output restriction information.

12. The system according to claim 11, wherein said image formation controller permits decoding of encrypted image data on the basis of the output restriction information when said second determination portion determines that the authentication information input by said authentication portion and the transmitted authentication information match each other and inhibits decoding when said second determination portion determines that the authentication information input by said authentication portion and the transmitted authentication information do not match each other.

13. The system according to claim 8, wherein when said second determination portion determines that the authentication information input by said authentication portion and the transmitted authentication information do not match each other, the image forming apparatus inhibits access to the image data stored in the information processing apparatus.

14. An image forming system comprising:
a first information processing apparatus;
a second information processing apparatus which receives image data from the first information processing apparatus via a network; and
an image forming apparatus which outputs the image data from the second information processing apparatus via the network,
the first information processing apparatus comprising:
an authentication information input portion which inputs authentication information of a user inputted by the user; and
a first transmission controller which transmits (i) designation information of the image forming apparatus, (ii) the image data, and (iii) the authentication information of the user to the second information processing apparatus,
the second information processing apparatus comprising:
an identifying unit that identifies an authentication method of authentication information received from the first information processing apparatus;

a first determination portion which determines whether an authentication portion of the designated image forming apparatus is adapted to authenticate the authentication method of the authentication information of the user received from the first information processing apparatus; and a second transmission controller which:
(i) in a case where said first determination portion determines that the authentication portion is adapted to authenticate the authentication method of the authentication information of the user received from the first information processing apparatus, controls data transmission so that data obtained by adding the authentication information of the user to the image data and output restriction information indicating whether or not to permit operation in a print mode of a predetermination color are transmitted to the image forming apparatus, and
(ii) in a case where said first determination portion determines that the authentication portion is not adapted to authenticate the authentication method of the authentication information of the user received from the first information processing apparatus, controls data transmission so that the image data is not transmitted to the image forming apparatus, and the image forming apparatus comprising:
an authentication portion which inputs authentication information of a user;
a second determination portion which determines whether authentication information of the user input by said authentication portion matches the authentication information of the user included in the data transmitted by said second transmission controller;
an image formation controller which outputs the image data when said second determination portion determines that the authentication information of the user input by said authentication portion and the authentication information of the user included in the data transmitted by said second transmission controller match each other; and
a restriction portion that restricts outputting of the image data by said image formation controller based on the output restriction information.

15. The system according to claim 14, wherein the second information processing apparatus is notified of the authentication method of said authentication portion of the image forming apparatus, and said first determination portion comprises an authentication information identification portion which identifies the authentication method of the authentication information input by said authentication information input portion on the basis of an information amount of the authentication information input by said authentication information input portion, and determines whether the authentication method of said authentication portion of the image forming apparatus matches the identified authentication method of the authentication information.

16. The system according to claim 14, wherein the authentication method includes at least one of a fingerprint, retina, voice, and password of the user.

17. The system according to claim 14, wherein the first information processing apparatus adds output restriction information to restrict output of the image data in the image forming apparatus, and transfers the image data to the second image processing apparatus; and said image formation controller controls the output of the image data on the basis of the output restriction information received from the second image processing apparatus with the image data.

18. The system according to claim 17, wherein said image formation controller permits decoding of encrypted image data on the basis of the output restriction information when said second determination portion determines that the authentication information input by said authentication portion and the transmitted authentication information match each other and inhibits decoding when said second determination portion determines that the authentication information input by said authentication portion and the transmitted authentication information do not match each other.

19. The system according to claim 14, wherein when said second determination portion determines that the authentication information input by said authentication portion and the transmitted authentication information do not match each other, the image forming apparatus inhibits access to the image data stored in the second information processing apparatus.

* * * * *